(No Model.) 2 Sheets—Sheet 1.

J. D. BANGERT.
APPARATUS FOR MIXING FLOUR OF DIFFERENT GRADES.

No. 512,354. Patented Jan. 9, 1894.

WITNESSES
Dan'l Fisher
Thomas Conroy

INVENTOR
John D. Bangert
by G. & W. J. Hward
Atty.

(No Model.) 2 Sheets—Sheet 2.
J. D. BANGERT.
APPARATUS FOR MIXING FLOUR OF DIFFERENT GRADES.
No. 512,354. Patented Jan. 9, 1894.
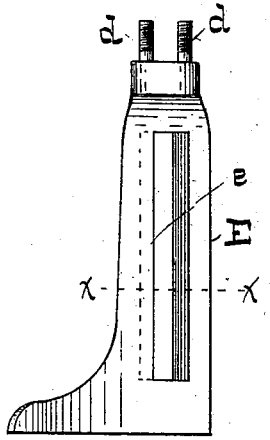
Fig 3.
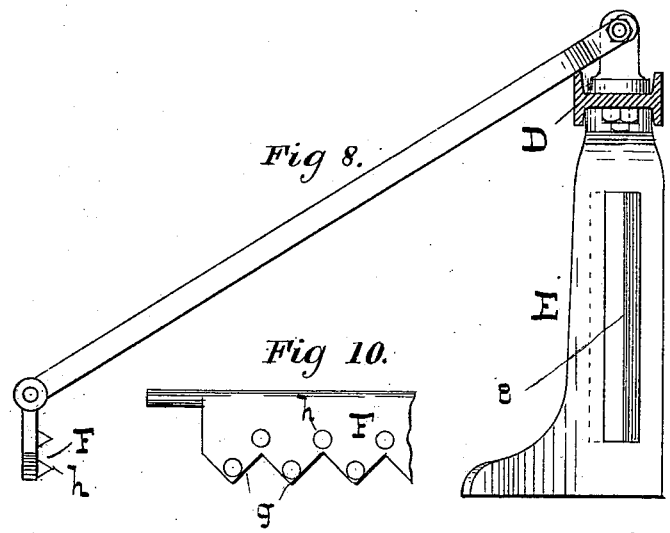
Fig 8.
Fig 10.
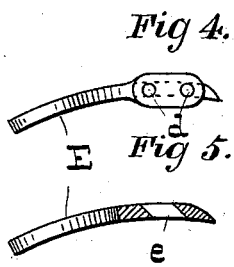
Fig 4.
Fig 5.
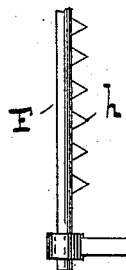
Fig 9.
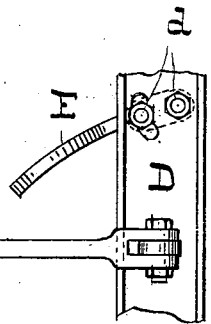
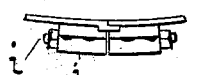
Fig 6.
Fig 13.
Fig 11.
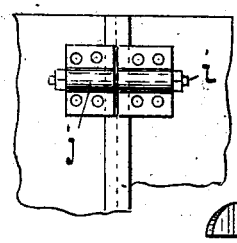
Fig 7.
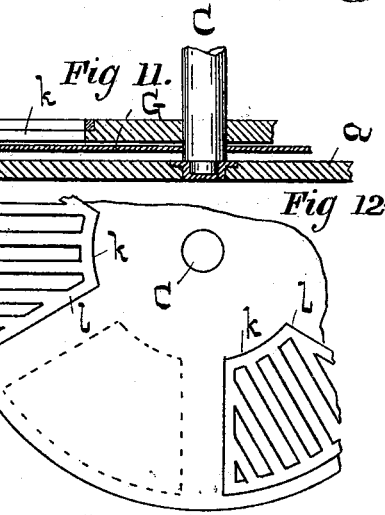
Fig 12.
WITNESSES
Dan'l Fisher
Thomas Conroy
INVENTOR
John D. Bangert
by W. T. Knaid, atty.

UNITED STATES PATENT OFFICE.

JOHN D. BANGERT, OF BALTIMORE, MARYLAND.

APPARATUS FOR MIXING FLOUR OF DIFFERENT GRADES.

SPECIFICATION forming part of Letters Patent No. 512,354, dated January 9, 1894.

Application filed October 4, 1892. Serial No. 447,797. (No model.)

*To all whom it may concern:*

Be it known that I, JOHN D. BANGERT, of the city of Baltimore and State of Maryland, have invented certain Improvements in Apparatus for Mixing Flour of Different Grades, of which the following is a specification.

In the description of the said invention which follows, reference is made to the accompanying drawings forming a part hereof and in which—

Figure 1:
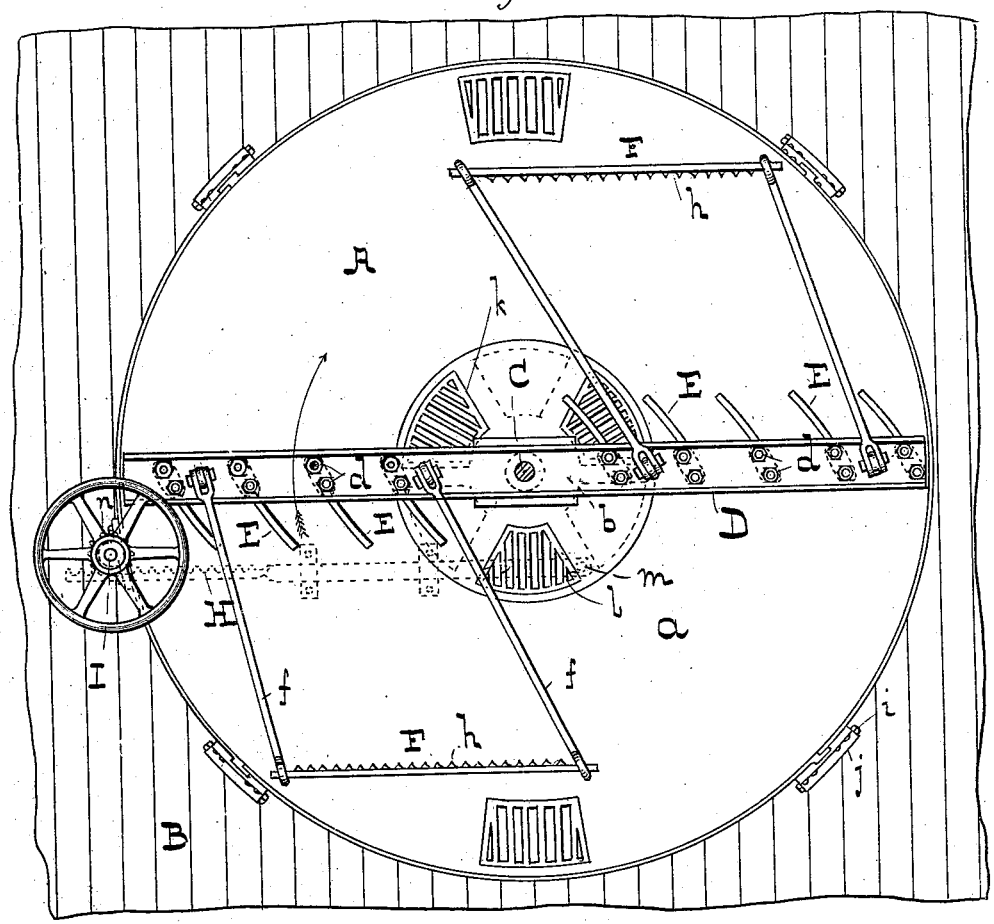
Figure 2:
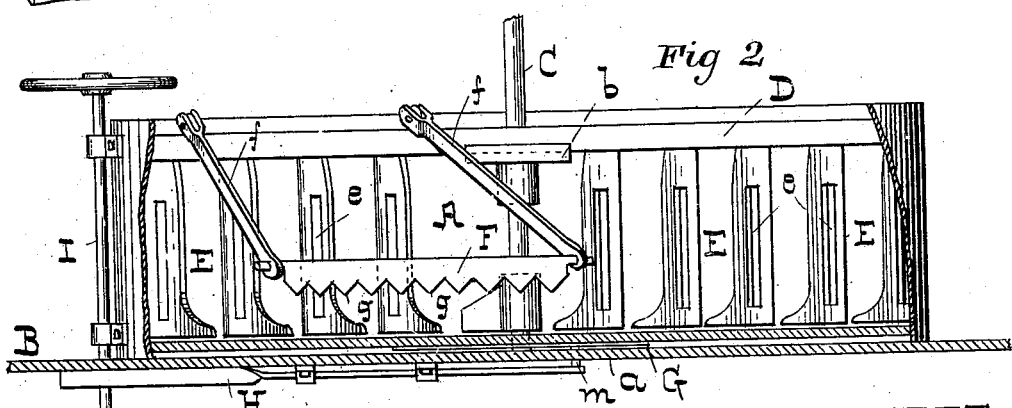

Figure 1 is a plan of the apparatus, and Fig. 2 is a side view with certain portions of the machine broken away. Figs. 3 to 12 inclusive, are enlarged details of the invention. Fig. 13 illustrates a modification in the construction of the apparatus, as will hereinafter appear.

Referring to the drawings, A is a cylindrical pan secured to floor B.

C is a central revoluble shaft stepped in the bottom $a$ of the pan A.

D is a beam of a length slightly less than the inside diameter of the pan A. A cross section of this beam is shown in Fig. 8. The center of the beam D is provided with a hole which admits of its being passed over the shaft C, and it is supported on a collar $b$ having two flanges between which the beam rests. The beam is suspended near the top of the pan A and is revolved with the shaft C.

E. E. are mixing bars dependent from the beam D, and they are held to the said beam by means of two bolts $d$ which pass through the beam. By reference to Fig. 9, it will be seen that one of the bolts $d$ is in a round hole, while the other is in a curved slot. This arrangement admits of the mixing bars being altered somewhat in position with regard to the beam. The mixing bars as seen from either the top or bottom are curved and the lower end of the bars is wider than the upper one, see particularly Figs. 4 and 5, the last named figure being a cross section of Fig. 3 taken on the dotted line $x$—$x$. The mixing bars E are slotted, the slots being denoted by $e$. See Figs. 3 and 5.

The curvature of the mixing bars E is such that in the rotation of the beam D, in the direction indicated by the arrow in Fig. 1, the materials to be mixed are thrown toward the center of the pan, and to effect the further mixing of the materials, the said bars on one end of the beam D are at distances from the center corresponding with those of the spaces between the said bars on the other. See Fig. 1. The materials which pass through the slots $e$ move toward the circumference of the pan.

F F are trailing rakes attached to the beam D by hinged rods $f$.

By reference to Figs. 8, 9 and 10, it will be seen that the trailing rakes, in addition to the tines $g$, have spines $h$ on their forward faces. These spines co-operate with the tines $g$ in tearing up the materials.

Figs. 6 and 7 are details of the side or wall of the pan A, and show how the segments of the same are connected. It will be seen that one segment has an offset which laps the plain end of the adjacent one. The connection thus formed is completed by means of bolts $i$ which pass through lugs $j$ riveted to the segments. At the center of the bottom $a$ of the pan A, are three segmental holes $k$ into which similarly shaped removable grates $l$ are placed. Either the segmental holes, or the grates, may be used as outlets for the mixed materials according to their consistency.

Beneath the pan A is a circular plate G having segmental openings corresponding to the ones $k$. This plate serves as means to open or close the discharge openings in the pan, and it is operated by means of a rack bar H hinged to a pin $m$ on the under side of the plate, and a pinion $n$ on a hand wheel shaft I.

A receiving hopper or spout, not shown, is situated under the pan A. When the central discharge is used, the said hopper is placed under the center of the pan, but should the beam be revolved in a contrary direction to that alluded to, and the materials forced toward the circumference of the pan, the grates will have to be situated near the circumference as shown in Fig. 1. It is best to provide the pan with both sets of discharge openings, so that the apparatus may be driven in either direction.

In some cases I provide the mixing bars E with slots $o$ and the bottom of the pan with spines or pins $p$ adapted to pass through the said slots. See Fig. 13.

The materials to be mixed are introduced to the pan and when the shaft is set in motion, they are operated upon by the mixing bars and the trailing mixing rakes. When the mixing operation is completed, the discharge openings are uncovered.

I claim as my invention—

1. In an apparatus for mixing materials, the combination of a circular mixing pan, a vertical revoluble shaft, a beam secured to the said shaft near the top of the pan, a series of mixing rakes dependent from the under side of the beam, each one of which is adjustable in angle of inclination, trailing rakes connected to the said beam by means of hinged rods, segmental discharge apertures having removable grates situated near the center of the pan, a register plate situated under the bottom of the pan, a toothed rack attached to the said plate, and a pinion on a hand wheel shaft whereby the said plate may be turned so as to either open or close the discharge openings, substantially as specified.

2. In a mixing apparatus, curved dependent mixing bars having two bolts at their upper ends, combined with a beam having for each mixing hole bar a hole to fit one of the said bolts and a curved slot for the other, whereby the said mixing bars may be altered in position and secured, substantially as and for the purpose specified.

JOHN D. BANGERT.

Witnesses:
WM. T. HOWARD,
DANL. FISHER.